(12) United States Patent
Boudville

(10) Patent No.: US 10,042,946 B2
(45) Date of Patent: Aug. 7, 2018

(54) HASHTAG, DEEP LINK AND LINKET FOR MORE USER INTERACTIONS

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 59 days.

(21) Appl. No.: 14/999,625

(22) Filed: Jun. 7, 2016

(65) Prior Publication Data

US 2017/0351693 A1    Dec. 7, 2017

(51) Int. Cl.
*G06F 17/30* (2006.01)
*G06F 17/22* (2006.01)

(52) U.S. Cl.
CPC ...... *G06F 17/3089* (2013.01); *G06F 17/2235* (2013.01)

(58) Field of Classification Search
CPC .......................... G06F 17/2235; G06F 17/3089
USPC ......................................... 715/205, 206, 208
See application file for complete search history.

(56) References Cited

U.S. PATENT DOCUMENTS

| 6,850,986 | B1 * | 2/2005 | Peacock | H04L 67/2804 370/466 |
| 7,277,408 | B2 * | 10/2007 | Sorsa | H04L 67/42 370/328 |
| 7,818,340 | B1 * | 10/2010 | Warren | G06Q 10/10 705/14.54 |
| 8,078,158 | B2 * | 12/2011 | Backholm | H04M 3/42178 455/419 |
| 8,433,800 | B2 | 4/2013 | Chor | |
| 8,527,862 | B2 * | 9/2013 | Scoda | G06F 17/3089 715/206 |
| 8,799,061 | B1 * | 8/2014 | Chatterjee | G06Q 30/0261 705/14.1 |
| 2007/0198342 | A1 * | 8/2007 | Collison | G06F 17/30864 705/14.1 |
| 2009/0015599 | A1 * | 1/2009 | Bennett | G06F 3/0486 345/680 |
| 2010/0161417 | A1 * | 6/2010 | Mitsui | G06Q 30/02 705/14.54 |
| 2011/0296289 | A1 * | 12/2011 | Tokashiki | G06F 9/4843 715/205 |
| 2013/0067026 | A1 * | 3/2013 | Hershko | H04L 61/106 709/217 |
| 2013/0110815 | A1 | 5/2013 | Tankovich | |
| 2014/0090077 | A1 * | 3/2014 | Jeong | G06F 21/51 726/26 |
| 2015/0154644 | A1 * | 6/2015 | Saxena | G06Q 30/0269 705/14.66 |
| 2015/0156061 | A1 * | 6/2015 | Saxena | H04W 4/003 715/733 |

(Continued)

*Primary Examiner* — Andrew R Dyer

(57) ABSTRACT

A mobile web page shows messages with a hashtag. The page shows deep links or linkets, related to the messages's topic. If a user clicks a deep link or linket, an app is launched on the mobile device, connecting to a different device. The user interacts with a second user. The latter can be an instructor, teacher or observer. The first user can be a student. Similar steps are done for a page with an author's username, where the page shows messages by the author and the messages have hashtags. This page has a linket ad. If the ad is by the author, she can promote herself or an item sold by her or an event where she will be playing. Increasing the chance that more people will click the linket and interact with her via the linket app.

1 Claim, 16 Drawing Sheets

10.20.30.40

(56) References Cited

U.S. PATENT DOCUMENTS

| | | | |
|---|---|---|---|
| 2015/0317343 A1* | 11/2015 | Cselle | G06Q 10/06 707/741 |
| 2015/0348097 A1* | 12/2015 | Andrianakou | G06F 17/30312 705/14.49 |
| 2017/0255681 A1* | 9/2017 | Giunio-Zorkin | G06F 17/30525 |
| 2017/0256007 A1* | 9/2017 | Barman | G06Q 50/12 |
| 2017/0316599 A1* | 11/2017 | Giunio-Zorkin | G06T 15/20 |
| 2017/0339093 A1* | 11/2017 | Pesavento | H04L 51/32 |

* cited by examiner

EnglishLearn    esl4://10.20.30.40

( message 1 )

( message 2 )

( message 3 )

Figure 2

EnglishLearn       "Easy English"

(message 1)

(message 2)

(message 3)

EnglishLearn    engage with someone ( message 1 )

( message 2 )

( message 3 )

EnglishLearn    "Easy English"

( message 1    "Bill teaches English" )

( message 2    "Stalk Strine" )

( message 3    "Kiwi Gold" )

Figure 5

Top Trends

KyrieAlbum — "! Buy Disco !"

election2020 — "vote 4 progress"

badderDrought — "Repair Leaks"

greenPower — "Install Solar"

Figure 6

HASHTAG, DEEP LINK AND LINKET FOR MORE USER INTERACTIONS

REFERENCES CITED

"Apps everywhere but no unifying link" by C. Dougherty, New York Times, 5 Jan. 2015.

"Deep linking's big untapped potential" by M. Thomson, VentureBeat.com, 9 Aug. 2015.

"Generating and presenting deep links" by V. Tankovich et al, US Patent Application 20130110815 (Oct. 28, 2011).

"Methods and systems for facilitating an online social network" by C. Evans, US Patent Application 20140089413 (Dec. 6, 2013).

"Text-synchronized media utilization and manipulation based on an embedded barcode" by C. Evans, US Patent application 20130334300 (Mar. 27, 2013).

"Smart link system and method" by J. Chor, U.S. Pat. No. 8,433,800, (28 Feb. 2011).

"Deep linking to mobile applications" by S. Saxena et al US Patent Application 20150154644 (Dec. 2, 2013).

"Deep linking to mobile applications" by S. Saxena et al US Patent Application 20150156061 (Dec. 2, 2013).

TECHNICAL FIELD

Deep links for mobile apps.

BACKGROUND

Mobile apps have a distinctive problem. Most are currently standalone programs that often just converse with an app server run by the company that wrote the app. The apps do not have URL links within them. In general, an app from one company does not interact with an app from another company.

Separately, it is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. FACEBOOK Corp. has APP LINKS. GOOGLE Corp. has APP INDEXING and GOOGLE INTENTS. TWITTER Corp. has APP CARDS. APPLE Corp. has APPLE EXTENSIONS. YAHOO Corp. has 2 US patents. There are also several startups, like BIT.LY, BRANCH METRICS Corp., BUTTON Corp., DEEPLINK Corp., FUKUROU Corp., HAPTIK Corp., HOKO Corp., LINKFIRE Corp., QUIXY Corp., TAPSTREAM Corp., URX Corp., WILDCARD Corp., and YOZIO Corp., each with its own initiative. The syntax and functionality vary between these company specific efforts.

We recommend that if the reader is new to the idea of deep links to read 2 articles. "Apps everywhere but no unifying link" by C. Dougherty, NEW YORK TIMES, 5 Jan. 2015. And "Deep linking's big untapped potential" by M. Thomson, VENTUREBEAT.com, 9 Aug. 2015. Both at least at this time of writing are available online. They are well written. The first article is accessible to the general reader. The second article has slightly more technical details. They give an understanding of deep links and the business potential, as understood publicly in the prior art of 2015.

SUMMARY

Consider a website that hosts hashtags, like TWITTER, FLICKR or INSTAGRAM. A page can have a hashtag as title, with messages that use the tag. The page has a deep link or linket added, with either being clickable when the page is shown in a browser modified to do so. If a linket is clicked, the app in its deep link is installed if it does not already exist on the device showing the page. The app connects to another instance of the app or an instance of another app. The user can interact via the app in a manner different from the HTML format of a browser. For mobile devices, the attraction is to offer the user more choices of interaction. This echoes the shift on mobile devices towards apps rather than browsers.

The linket is a contextual ad. The website charges to show the ad. If the hashtag and messages containing it are about a style of music, the linket can be for a band promoting its album or an upcoming concert.

The website can auction linket positions near hashtags. A given hashtag's messages can be analysed to find the topics. A linket owner bidding on a placement can bid only on pages with hashtags on the same topic as the linket, to increase the chances that a reader will click the linket. Algorithmic auctions are possible for a linket position.

Another type of page at the website shows the messages by the same author. The messages could have different hashtags. A linket ad can also be put near the author's name. If the ad is by the author, this lets the author promote something about the author. For example, if the author is a band, they can promote a new album or upcoming concert. This also gives an incentive for the author of hashtag messages to write more such messages. The greater the audience, the more the chance that some will click on the linket ad and interact with the band according to the capabilities of the linket app.

A page at a non-hosting site shows a hashtag or the author's name. The page can have a linket ad put in proximity. This site can also auction the ad position.

An overlay of webpages is done, via a website or app or browser mod. An existing webpage is altered to make a hashtag or author name clickable. Picking either can cause a linket to be shown and, in turn, selected. The latter causes an associated app to be run on the user device. The overlay has a database of hashtags and linkets associated with each tag or author name. The overlay sells ad placement.

The linket Registry can let hashtags be defined. A hashtag can map to a deep link or a linket. The Registry charges for registering a hashtag. It makes a separate charge for mapping that hashtag to a linket. Similar to what it charges for a linket to be defined and to map to a deep link.

A webpage can have a linket. If a hashtag is to be shown near the linket, a suitable hashtag can be of the same topic as the linket.

BRIEF DESCRIPTION OF THE DRAWINGS

FIG. 2 shows a webpage of a hashtag and a deep link.

FIG. 3 shows a webpage of a hashtag and a linket.

FIG. 4 shows a webpage of a hashtag and a link to a deep link or linket.

FIG. 5 shows a webpage of a hashtag and messages with deep links.

FIG. 6 shows a top level page of hashtags and deep links or linkets.

DETAILED DESCRIPTION OF THE PREFERRED EMBODIMENT

Figure 1:
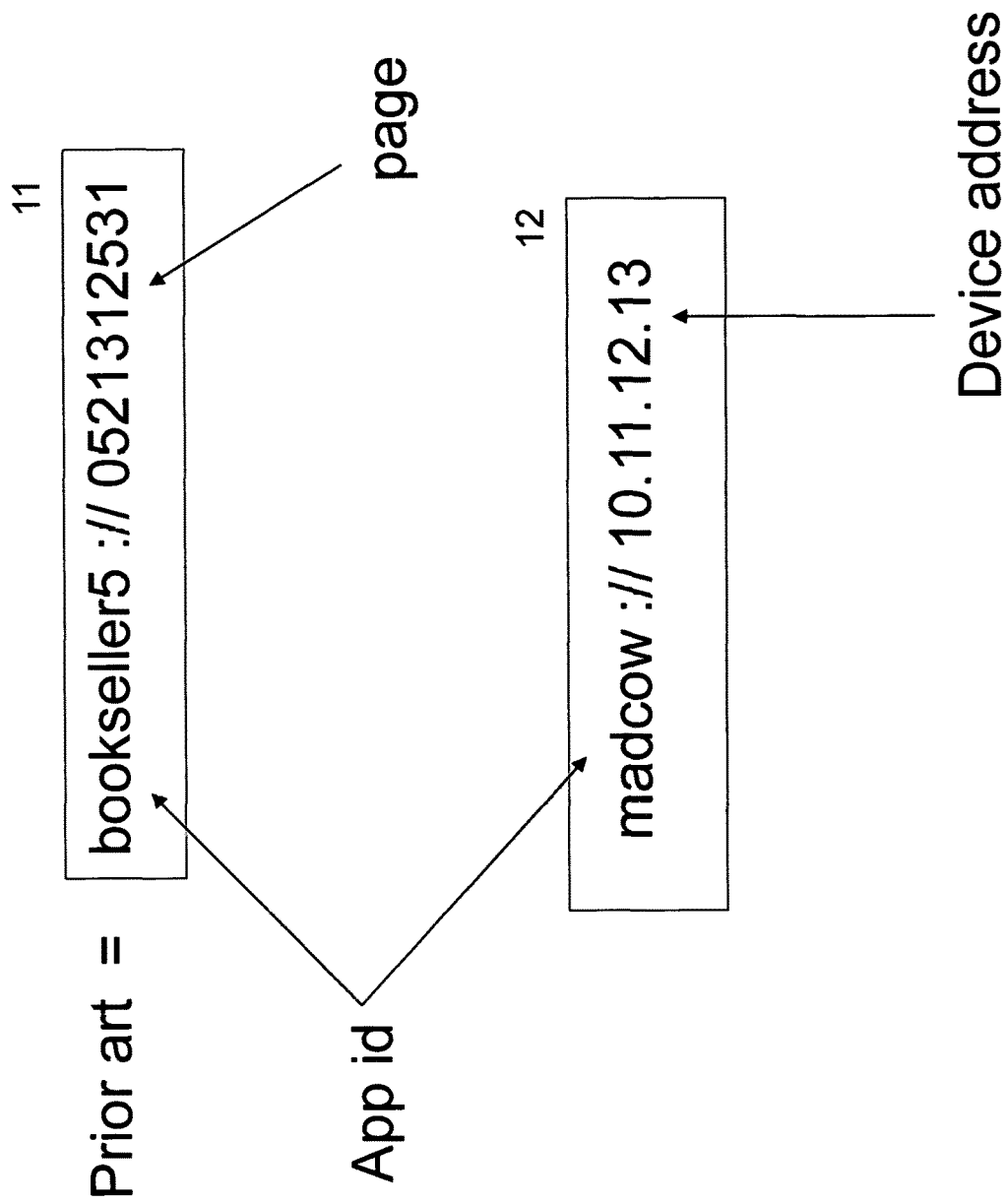
FIG. 1 shows deep links in the prior art and the present submission.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"].

We have these co-pending applications for deep linking:
"Deep linking of mobile apps by barcode, sound or collision", filed Feb. 182015, U.S. patent application Ser. No. 14/544,763 ["10"],
"Cookies and anti-ad blocker using deep links in mobile apps", filed Jun. 8, 2015, U.S. patent application Ser. No. 14/545,694 ["11"];
"Blockchain and deep links for mobile apps", filed Jul. 28, 2015, U.S. patent application Ser. No. 14/756,058 ["12"];
"Different apps on different mobile devices interacting via deep links", filed Aug. 18, 2015, U.S. patent application Ser. No. 14/756,208 ["13"].
"Linket to control mobile deep links", filed Oct. 19, 2015, U.S. patent application Ser. No. 14/756,815 [14].
"Capacity and automated de-install of linket mobile apps with deep links", filed Nov. 10, 2015, U.S. patent application Ser. No. 14/757,027 ["15"].
"App social network via linket and ads for mobile deep links", filed 11 Dec. 2015, U.S. patent application Ser. No. 14/757,261 ["16"].
"App group, ad bandwidth, hand off for linket and mobile deep links", filed 28 Dec. 2015, U.S. patent application Ser. No. 14/998,349 ["17"].
"App streaming, bidirectional linket, phone number for mobile deep links", filed 4 Jan. 2016, U.S. patent application Ser. No. 14/998,440 ["18"].

We described deep links and ways that these could enhance interactions between two mobile devices near each other. The current submission describes a higher level of use of deep links.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like APPLE Corp., MICROSOFT Corp.), or a provider of an operating system for mobile devices (like GOOGLE Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

Related to this is a notational convenience. We shall refer to an app, and call it Alpha, for example, in the text and figures. Sometimes "Alpha" shall mean the app executable. Other times, it shall mean the id of the app, where the id is unique across "all" apps. In turn, "all" might mean across all apps in an app store for a given hardware platform. Or across all hardware platforms.

This submission has the following sections.
1: Earlier submissions;
2: Hashtag;
3: More details on users interacting;
4: Extensions;
5: Auctions for hashtags;
6: Feedback loop;
7: Ad hoc community of visitors;
8: Hosting page of messages from an author;
9: Non-hosting page;
10: Linket overlay;
11: Hashtag collision at linket Registry;
12: Linket and app for hashtag collision;
13: Alternative deep link;
14: Picking a hashtag for a linket;
1: Earlier Submissions;

This submission extends our work in submissions 14, 15, 16, 17 and 18 on linkets. We encourage the reader to read those for a fuller discussion of linkets. In this section, we summarise that earlier work.

The prior art uses "deep link" to mean two apps running on one mobile device. The first app has a deep link which is selectable by the user. When the deep link is selected, something happens to cause the second app to be installed on the device. Since typically the second app is not present. The second app is run, with an input argument which causes it to start up and show a particular item or "page", rather than just a generic "home page". The "something happens" refers to different ways that different companies have, to enable this.

FIG. 1 is FIG. 1 of submission 14. Item 11 is a deep link in the prior art.

Our deep link, as defined in submissions 10-18, is fundamentally different. It lets 2 mobile devices interact. One major category (or use case) for us (and not in the prior art) is one app running on 2 mobile devices. By one app, we mean 2 instances of the app. Another category is 2 apps running on 2 mobile devices. One app runs on one device, another app runs on the other device, and the apps interact across the network. Our deep link is for (though not exclusively) multiuser interactions. The category of one app on 2 devices can be for multiplayer games. Or even a single player game, where the second device runs a second instance of the game in spectator mode. The second device screen shows the game window of the first device. But the second device cannot alter the game position on the first device. (There are some caveats for situations where the second device might make some alterations.)

Item 12 is a deep link from our submissions. It has an id of an app, "madcow". But it also has a network address, 10.11.12.13, of a device (like a cellphone) running an instance of madcow. The address is hypothetical and represents any Internet Protocol version 4 address. It also represents an IPv6 address.

Suppose madcow is a two person game. The first person, Jane, has her phone at that Internet address. She starts madcow. She needs a second player. She picks an option in the game that makes the deep link 12. She sends this perhaps via an electronic message (e.g. email, SMS) to Bob. In general, he does not have madcow installed on his device. He reads the message in a mobile browser. The browser shows the deep link as a clickable link. Bob clicks it. The browser, perhaps in tandem with the device operating system, installs madcow and runs an instance. Giving it the input 10.11.12.13. This tells Bob's madcow instance to connect to another madcow instance at that address; which happens to be Jane's instance. Her instance is listening at a port for Bob's instance. Because these are instances of the same app, the port number can be hardwired into the app. Or the port number can be found from the app server when both instances boot and contact the app server. We assume the common case where the app connects to an app server.

Jane and Bob now play the game.

We define a "linket" to be the label of a deep link. The linket can be expressed in Unicode. The linket can be case sensitive, unlike domain names. This improves the readability of expressions. Case sensitivity is moot for languages like Chinese or Hindi which do not have the concept. The linket can have (but not necessarily has to have) white space.

The linket lets individuals have a personal brand associated with themselves. This follows the observation that many (or most) people in many countries now have cellphones. A user's cellphone becomes an extension of herself, as has been observed. It is the most common type of personal computer in the world.

Hence a person can own a linket. Of course, a corporation can also own a linket.

Another trend observed is the rise of the so-called gig economy, as exemplified by companies like UBER, LYFT and AIRBNB letting individuals offer their services. Where the labour market tends to a friction free state. Our linket and the personal branding it offers is another enabler of the trend.

However, the hardware barrier to entry of a person owning a linket is much cheaper. For AIRBNB, the user needs to own (or rent) a home. To own can cost over $US300 000. For UBER, the user needs to own or rent a car. To own can cost $US20 000. In contrast, to use a linket requires a cellphone. A top of the line phone can cost $US600. One to two orders of magnitude cheaper than the other cases.

For descriptive simplicity in what follows, we shall write the linket as a string enclosed in quotes. This is meant to describe its string contents in an understandable way that is independent of a choice of format.

2: Hashtag;

Hashtags have become very popular on various websites. Notably TWITTER Corp.'s website. But also on the websites of INSTAGRAM Corp., FACEBOOK Corp. and FLICKR Corp. A hashtag is a Unicode string (with no whitespace symbols) preceded by a hash or pound symbol '#'. There is a variant available when showing Chinese, where a trailing hashtag symbol is used as a delimiter.

The methods of this submission pertain even if other delimiters are used.

Let Theta be a website that "hosts" hashtags and accompanying messages. By this we mean a website where the hashtags are defined. Note that collision can happen. Two hosting websites can both define the same hashtag, where the meanings of the associated messages or of the hashtag itself are different.

The hosting can be done like the preceding cited websites, but is not limited to those. Theta has a webpage, shown as item 21 in FIG. 2. There is a hashtag #EnglishLearn. Near it is a deep link, in the meaning of FIG. 1. Under these are various messages that typically use the hashtag. The deep link is depicted as clickable, as suggested by the black bar under the deep link. The browser showing the webpage has been modified so that it can depict a deep link as a clickable link. Possibly the operating system may also have been altered to enable this.

We stress that the deep link is not a standard URL.

There can be other ways that the deep link can be picked via the user interface. For example, instead of the deep link being visible by default in FIG. 2, it might be absent by default. The user could right click on the hashtag, to show a popup menu. In this menu is an item which is the deep link, and the item can be picked by the user. Or the page that shows the hashtag and its messages might have another icon or widget, which when pressed shows the deep link as a selectable item. Or if the hashtag is double clicked, then the deep link is activated.

We assume the reader is familiar with common graphical elements, so we omit figures depicting these scenarios.

Returning to FIG. 2, we suppose that Jane teaches English, and runs an app, shown with the app id esl4. This id is meant to suggest "English as a Second Language". Though in general, an app id might have no semantic value; it could be a randomly generated string, for example. Simply for descriptive ease in this submission, the id in FIG. 2 shown with a semantic value.

The Internet address 10.20.30.40 is the current address of her mobile device, on which she is running an instance of esl4 in teacher mode. She is looking for students, who would run the app in student mode and connect to her instance.

Hence Theta might charge Jane to show her deep link on Theta's page for the hashtag #EnglishLearn. Visitors to the page may be interested in the topic suggested by the hashtag's semantics. If so, some visitors might likely want to learn English or to improve their current ability in English.

The deep link on the hashtag page is a contextual ad. The context is that the deep link refers to an app whose topic is similar to or the same as or somehow related to the topic of the hashtag. Google and Facebook have shown the value of contextual ads. Google uses the context of search term input by the user. Facebook uses what it knows about the person whose Facebook page contains the ad.

In FIG. 2, why can't Theta just put a standard URL, that links to a webpage of a person teaching English? The latter person then tries to persuade visitors to her webpage to sign up for paid lessons. Theta can do this, but this is well covered in the prior art as just a conventional contextual ad accessed by an URL. In our submission, using the deep link lets the teacher teach and the student learns via an app instead of via a webpage. This is a different type of interaction. Currently on mobile phones, users only use the browser some 20% of the time. The other 80% is spent in apps. Users favor the app experience over a browser. Thus we suggest that our deep link has value to teachers and students, where the students visit the hashtag webpage on a mobile browser.

If a student clicks the deep link, the esl4 app is installed if not already on his device. The app is run, in this case in student mode, and it connects to Jane's Internet address.

A variant of FIG. 2 is where it is a screen in an app written by Theta. In this case, it is assumed that the deep link is clickable. And if the user clicks, the app allows the steps of the previous paragraph. Without loss of generality, we shall assume the case where item 21 is a webpage, with the implicit inclusion of item 21 being in an app.

By selling ad space in the format of a deep link, Theta garners ad revenue. Another advantage for Theta is that aside from the fee it charges Jane, its webpage has greater functionality for the reader. He can now learn via an app accessible from the page, instead of from another webpage, from a website teaching the subject. This second advantage lets Theta garner a greater readership. In turn this improves the value for advertisers like Jane who want that larger audience.

In FIG. 2, though Jane has the deep link, there is no requirement that she has previously posted any of the messages with that hashtag.

Now suppose instead of a deep link, Jane owns a linket, "Easy English". She pays for the ad space in FIG. 3. Item 31 is equivalent to item 21. The linket is depicted as clickable, as suggested by the black bar under the linket. We follow the convention of our earlier submissions by writing the linket in double quotes, both in the text of this submission and in FIG. 3. In an instantiation of linkets, there would be some specific choice of one or more delimiters. Where the leading delimiter might be one or more symbols. And where there might be a trailing delimiter (especially to allow white space to be shown in the linket). If a trailing delimiter exists, it could be one or more symbols.

Given a choice of delimiters, the browser can detect the contents within those delimiters, and just show the contents as in FIG. 3. Without showing the delimiter symbols themselves.

In FIGS. 2 and 3, the hashtag itself might be clickable. If so, what effect this might have on the pages or screens of those figures is left up to the server.

By comparing FIGS. 2 and 3, the reader can see that FIG. 3 has more meaningful semantics to the visitor to the webpage. At least if the linket is well chosen. Whereas the deep link of FIG. 2 has Jane's current raw Internet address. Which has no semantic value to most (all?) visitors to the page. Plus, tomorrow, she might have a different IP address.

So the use of the deep link is likely to be outdated by tomorrow. If not later today, were Jane to move to a different hot spot, say, and acquire a new and also temporary IP address different from that shown in FIG. 2.

Also, in FIG. 2, the app id was shown as esl4, to suggest that the id has some semantic value apparent to the visitor. But this is not necessarily so. The id is largely given by rules of how apps are assigned ids in an app store. If say an app store uses a naming convention of pseudo-random characters, then no semantic meaning will be apparent to the visitor.

Of course, Theta can now sell ad space in the format of a linket.

Theta might show deep links or linkets. Though, as in FIGS. 2 and 3, if only one ad is shown per hashtag page, then the page would show one deep link exor one linket.

Some teachers might not have a linket, but just use a deep link. Hence if Theta wants their business, it could show deep links.

Because a linket can have more semantic value than a deep link, the linket is more likely to be clicked. If Theta has some type of clickthrough arrangement, whereby it gets paid extra if a visitor clicks the deep link or linket, then Theta can have a policy favoring showing a linket. It could simply charge more to show a deep link. On the grounds that it is less likely to get clickthrough revenue, so it has to make up for this with the greater upfront fee.

A variant of FIGS. 2 and 3 is where more than 1 linket or deep link are shown on the hashtag page. How these ads are arranged can vary and largely we shall say no more on this. But if more than 1 ad is shown, restraint is suggested, by Theta not having too many, to avoid a cluttered user interface. The classic Google search page with a few paid ads can be used as guidance.

Suppose a deep link is shown, as in FIG. 2. It might be expected to be temporary, as the user who posted that deep link will eventually be unavailable. Theta could have a policy where if a deep link is shown, after some default time, like 4 hours, Theta makes the deep link non-clickable. Or Theta does not show the deep link.

A deep link or linket could also map to a bot or chatbot. We consider these terms equivalent in this submission. In this case, and in the case of the deep link or linket pointing to a human (Jane), there might be a capacity limit of a maximum number of users that the bot or human can interact with at the same time, via the app. So the deep link or linket when sent as an ad to Theta can have a maximum number associated with it.

Whenever a user seeing the webpage clicks on the deep link or linket, apart from the actions on the user's mobile device to install and run an app, Theta can also be told. It counts the number of clicks. If the number reaches the maximum, Theta alters the webpage of FIG. 2 or 3 for future downloads of the webpage to any devices that request the webpage, if it can. Likely it can. At this time of writing, most recently made browsers (including for mobile devices) enable methods where the web server can alter a page appearing on the browser.

If Theta changes the webpage, it can disable the deep link or linket. Or it can remove it. If the latter, Theta might insert another deep link or linket. Perhaps from another bot or person offering a similar service to that of the first deep link or linket.

A variant of FIG. 3 is shown in FIG. 4. Item 41 is a webpage. The "engage with someone" is a clickable link. Here, the "engage" label is not the label of any of the underlying linkets. If the user picks it, Theta is notified. It has a list of deep links or linkets. The first click by anyone on any instance of page 41 causes Theta to reply with the first deep link or linket. The second click, which in general will be at a different page instance, on a different device, causes Theta to reply with the second deep link or linket. Etc.

In turn, this can be modified if as described above, each deep link or linket has a maximum capacity associated with it. So if the first deep link or linket has 5, then the first 5 clicks on instances of the page will cause Theta to reply with the first deep link or linket. The sixth click causes Theta to reply with the second deep link or linket.

If a deep link or linket has a maximum >1, then Theta can charge the owner of that item extra. In practice, if Theta charges by the click, then this automatically accommodates handling the maximum.

Another variant is to consider the linket Registry. Akin to a conventional DNS Registry, which maps a domain to an Internet address. The linket Registry (henceforth just "Registry") maps from a linket to the current associated deep link. The Registry can have a related mode where it maps from a hashtag submitted to it to an associated linket or deep linket. If the hashtag has no such mapping, the Registry just returns some error or status message.

The point here is to extend the use or meaning of a hashtag, to a mapping (hashtag, deep link) or (hashtag, linket). Where the latter might be considered equivalent to (hashtag, linket, deep link).

Consider now when Jane submits a deep link or linket to Theta, for publication in a webpage like FIGS. 2-4. Theta might have a whitelist or blacklist of apps. If Jane's app is in the whitelist, then Theta will show the deep link or linket. If her app is in the blacklist, then Theta will not. If her app is in both lists, then Theta has some policy to handle this case. For example, Theta can ensure that its lists never overlap.

Theta might take its white and black lists from different sources. A blacklist could come from an antispam organisation like SPAMHAUS. Theta might charge companies to be put on its whitelist.

A variant on FIG. 3 is where the messages on the webpage might also have deep links or linkets. See FIG. 5. Item 51 is the webpage. It shows a linket "Easy English" next to the hashtag, as in FIG. 4. The 3 messages each have a linket. No message is shown with a deep link, but the reader can easily imagine that case. Theta might use the format of FIG. 5 as a means to show more deep links or linkets. Show more ads.

Suppose page 51 has the format that message 1 is the most recent, message 2 is the previous most recent etc. And that when the reader refreshes the page, the last message about the hashtag is now message 1 and this pushes down the previously shown messages. Or this might happen automatically, without the reader doing any manual refresh, by Theta refreshing the page. Theta could keep the linkets where they are. So the linket "Bill teaches English" is associated with the position of the most recent message, rather than the message itself. Etc.

There can be value here in the message position. An ad for the message 1 position might be more valuable than the ad in the message 2 position.

The alternative is that as a message scrolls down when new messages are posted, the deep link or linket follows it and keep being shown next to it. A possible problem is that a competitor to that deep link has incentive to post spurious messages with the hashtag. Simply to force that competing link down and out of sight. Below the fold, in the parlance of newspapers.

If a hashtag on a page is clickable, then a linket or deep link might not appear near it until the tag has been clicked for a minimum number of times. One reason can be that the advertiser who owns that linket or deep link wants that as a measure of the popularity of the hashtag or the page in which it appears. The advertiser does not want to pay for its linket to be in a page that few read.

In FIG. 5, while a message can have a deep link or linket shown next to it, that item was not part of the message. An alternative is where the message also has a deep link or linket. Written perhaps by the author of that message. Theta has choices in whether to allow this or not.

First.

Theta could parse an incoming message to detect such a deep link or linket. It can have a policy that if this is found, the message will not be posted.

Second.

Theta finds and removes the deep link or linket before showing the message.

Third.

Theta shows the message with the item. Theta charges the author. In part, this can be because the author of the message is the one that the deep link or linket points to. She wrote the message with this pointer to herself, in the hopes of getting a response. Perhaps so that she could earn money via an instructional app. De facto, she posted an ad. Theta charges her for posting an ad.

As part of the third choice, Theta might run a whitelist or blacklist against a deep link or linket in a message. If say the item is in a blacklist, then Theta will not show the message, and forgo any ad revenue. If the item is in a whitelist or not in the blacklist, then Theta shows the message and charges a listing fee.

Operationally, if Theta were to show the message and also impose a fee, it might do the latter first. Only if it gets payment is the message shown.

If a message shows a linket or deep link, this might have been written by Theta, and not by the author of the original message. Depending on implementation or a policy by Theta, the display of such messages might or might not show such a linket or deep link in a different way from those written by the message author.

Other types of pages that show hashtags and ads are possible. One example is FIG. 6. Item 61 is a top level page showing the current most popular hashtags. If the reader clicks on a hashtag, a page appears similar to FIG. 2 or 3, where the messages for that tag are shown, along with ads. But item 61 also has linkets shown by each popular tag. (A deep link could also be shown, instead of a linket.) Each linket would preferably be related to the topic or keywords of the hashtag's messages.

The page of item 61 by default would not show messages. To give enough space to list the top hashtags. A minor variant is where there might be a widget by each hashtag. If the user clicks the widget, some of the messages for that tag are shown in the page. And if the user clicks the widget again, the messages are not shown.

The linket shown by a hashtag here need not be the same as the linket by the hashtag in the page corresponding to FIG. 2 or 3.

There could be a hierarchy of pages like item 61. The top page could be a list of top level topics, like politics, sport, business. Possibly no or a few hashtags and deep links and linkets are shown on this page. If a topic is clicked, then another page appears. The user can drill down to a page like item 61, where now all the hashtags are on a given topic.

Figure 7:
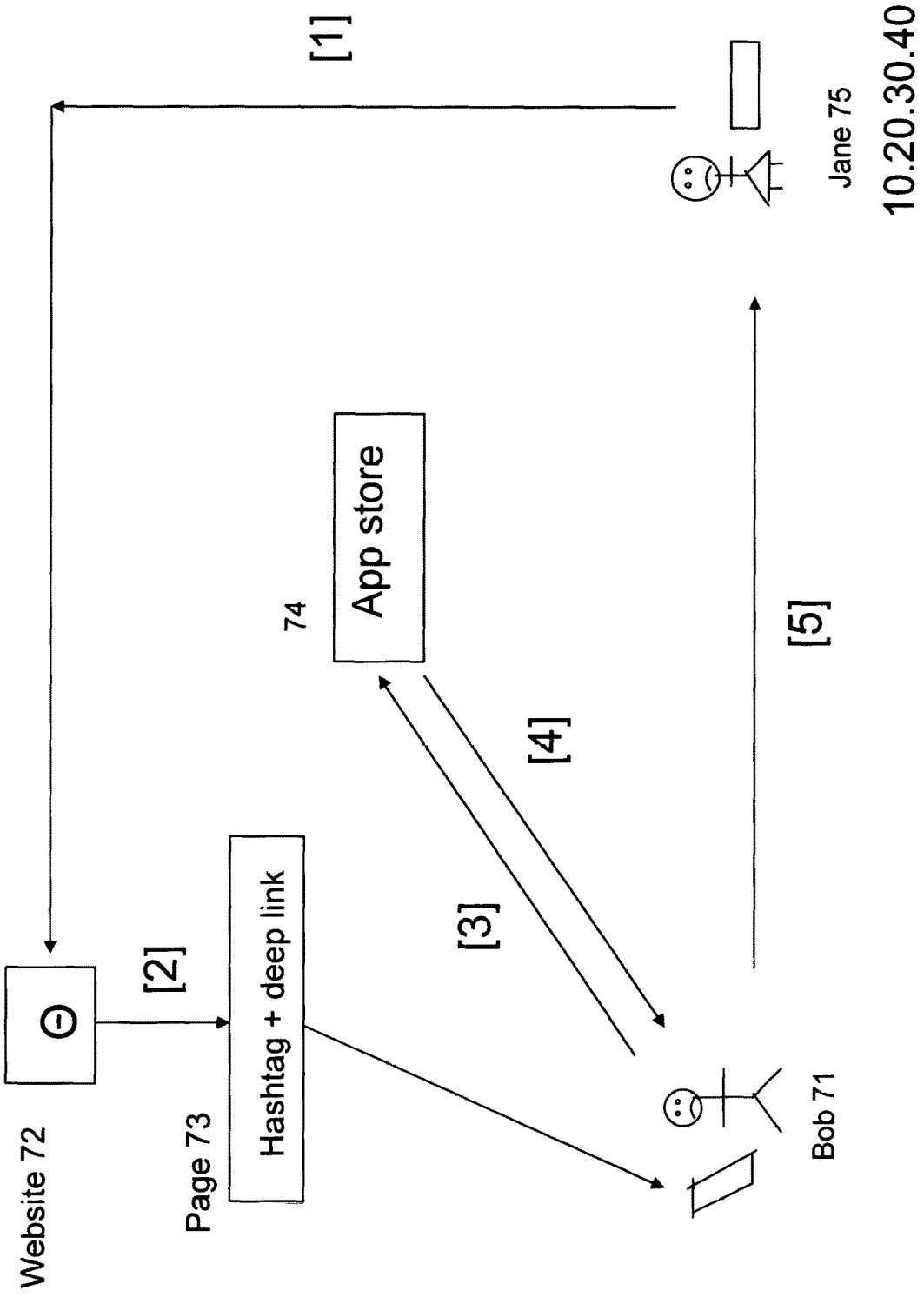
FIG. 7 shows a user clicking on the deep link of FIG. 2.

3: More Details on Users Interacting;

In this section we expand on some details of how a user how clicks on a deep link in FIG. 2 would interact with another user. FIG. 7 shows a user Jane 75 who has a mobile device at address 10.20.30.40. Her mobile device is not separately itemised in the figure. It is the rectangular object next to her. She teaches English using the deep link in FIG. 2. In step 1, she sends her deep link to Theta website 72. She starts her app instance.

Theta makes the webpage 21 in FIG. 2. This webpage is depicted as item 73, with the label 'Hashtag+deep link'. In general, the webpage, as per item 21, will have other contents, like the messages with the hashtag.

Bob 71 has his mobile device. The latter is not separately itemised in the figure. It is the off-rectangular object next to Bob. It shows page 73. He clicks the deep link. If the app in the deep link is not on his device (the usual case), his device makes a query to app store 74 in step 3. The app store is an app store appropriate for his mobile device. The query causes a download in step 4 and an install. The app is run in step 5 and contacts the address 10.20.30.40. At this is Jane's app instance, awaiting such a query. Jane and Bob then interact via the particulars of the app.

For simplicity, FIG. 7 omits the likely case where Bob's app instance will talk to its app server, which is the same one that Jane's app instance talked to earlier.

Figure 8:
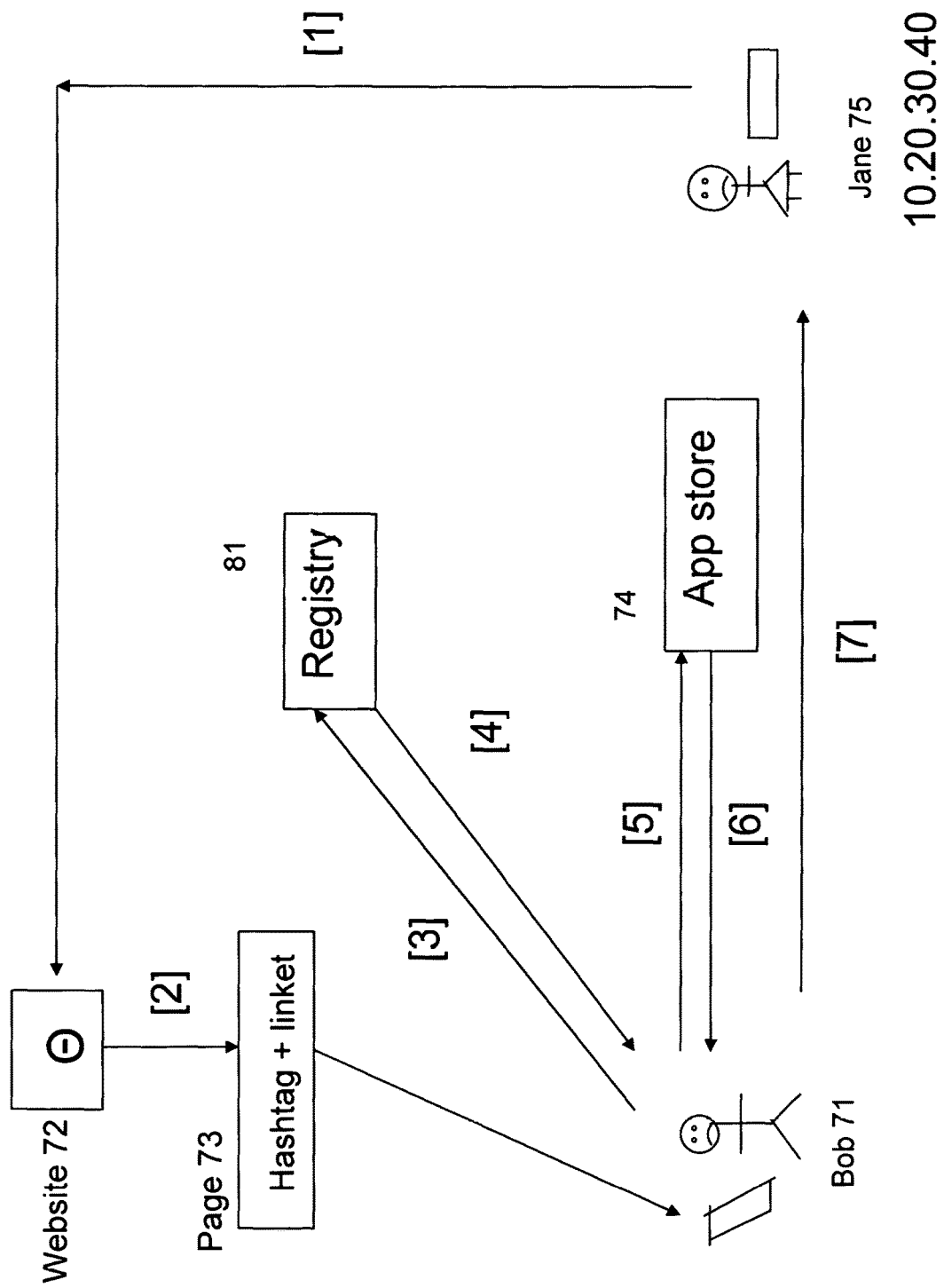
FIG. 8 shows a user clicking on the linket of FIG. 3.

FIG. 8 is for the case of FIG. 3, where a linket is shown on the hashtag page instead of a deep link. Bob 71 and Jane 75 are as in FIG. 7. In step 1, she sends her linket to Theta 72. It is assumed that her device has already told Registry 81 to map from her linket to her current address 10.20.30.40. Theta 72 gets her address from the sender address of the Internet packets sent by her device.

Step 2 has Theta making the page which now has the hashtag and linket, as in FIG. 3. Suppose Bob clicks the linket. This causes step 3, where his device sends the linket to the Registry, which replies in step 4 with the deep link esl4://10.20.30.40.

Steps 5 and 6 have Bob installing the esl4 app from the app store 74 if he does not already have the app. Step 7 is his instance of the app contacting Jane's instance.

4: Extensions;

In the prior art, a deep link is something like "appId://SKU", where SKU is a stock keeping unit or equivalent identifier of a product for sale. And appId is the id of an ad app, where the app is a front end to the ad app server that has a database of items for sale. In this submission, such a deep link might be shown in FIG. 2. Letting Theta offer the reader a way to buy something via an (ad) app, rather than through a webpage on a browser.

Linkets were shown in several previous figures as text. A linket can also have a logo, in some graphical form, as well as audio and video. It is straightforward for the reader to envisage that the text linkets of the figures have instead of plain text, a graphical design that is the logo part of the linket. While for audio and video, there might be a button next to the text or logo. If the reader clicks this, an audio or video plays.

In FIGS. 2 and 3, a deep link or linket might be shown where first Theta gets the network address of the mobile device on which the webpage will appear. Theta maps this to an approximate location. If the latter is in a given region Alpha, then the deep link or linket will be shown. If the location is in a region Beta, a different deep link or linket might be shown. Put simply, Jane might only want and pay for her deep link or linket to appear when the user's device is in the US, for example. If the device is outside the US, she does not want her item to appear and her to be billed by Theta.

In similar wise, Jane might only want her deep link or linket to be shown during the hours of 9 am-5 pm, US Central Time. Because those are the hours in which she will be teaching.

This relates to our first linket application "14", where a linket can inherently have a time slot dependence. Because the linket is serviced by a human and not a machine.

The steps of the previous 2 paragraphs can be combined. So the appropriate linket is a function of both the date (and time) and (approximate) location of the mobile device requesting the webpage.

This time dependence can be held at the Registry. When Jane sends her deep link or linket to Theta, some details can be accessed by calling the Registry. The Registry lets Theta do a programmatic access via an API.

5: Auctions for Hashtags;

Theta can have auctions for a hashtag. For the right to show a deep link or linket near a hashtag in the manner of the earlier sections. The auctions might be manual (like EBAY auctions) or programmatic (eg. like GOOGLE).

Given the often real time nature of hashtags and the messages which contain them (a big appeal to many users), there is a need for deep link or linket owners to automatically bid for and win ad placements near popular trending hashtags. This is a basic difference between a website that shows hashtags and messages and, say, a search engine like GOOGLE and how it lets people bid to show their ads. Suppose a user at a search page types 'car'. The results are shown in the resulting page, below the search term. These are the free or organic results. But ads are often shown on the right hand side. At an earlier time, an advertiser goes to the search engine's ad bidding page. She types 'car' and gets a page showing how much it would cost her for her ad to appear on a result page when someone searches for car. Her ad, presumably, is related to car. This is a contextual ad. Which vastly improves the odds that the user will click on it.

The point is that search terms are known a priori. But a defining property of many popular hashtags is that they are a new sequence of characters. So Theta and advertisers do not know beforehand what to bid on.

Consider when a new hashtag is shown on Theta and messages start being shown with that tag. Theta extracts keywords from the messages and uses these to find the topics that the messages are about. The topic names and keywords constitute one set of tokens. Theta might also try to decompose the hashtag into some discernible words. But this can be problematic.

For example, consider the TWITTER hashtag #jesuis-Charlie, which arose after the January 2015 terrorist incident at Charlie Hebdo publisher in Paris. It is trivial for a machine to parse the hashtag itself into "je suis Charlie" and to machine translate to "I am Charlie". But in this example, both sets of words give little intrinsic meaning about the hashtag. However, parsing the messages containing the hashtag would soon give the English keywords "terror", "Paris", "Charlie Hebdo". As well as keywords in other languages.

Before this, Jane, who has a deep link or linket, defines the keywords or topics that her item refers to. Theta lets Jane pre-register these words and her deep link or linket with itself. When a new hashtag appears, an overlap is found between the hashtag's tokens (found mostly from the messages) and Jane's tokens. If there is sufficient overlap, Theta can have Jane automatically bidding for placement with the hashtag. Where Jane previously defined how much she is willing to pay.

We use keyword and topic interchangeably. A keyword need not be restricted to a word or phrase in a message.

Theta does this for all deep link or linket owners who registered to bid with it. The highest bidder for a hashtag gets her item placed on the page with the hashtag.

For non-programmatic bidding, Theta sends emails or SMSs to those owners who previously signed up to be notified. They might or should have given Theta a list of their keywords. So they only get told when a hashtag has appeared that seems related to their expertise. They can go to Theta and manually bid on the hashtag.

When a hashtag is new, there are only a few messages with it. Doing the above steps to get the keywords from the messages can be inaccurate. Placing an ad next to the hashtag has a chance of error, in the sense of the ad's topic being askew from the messages' topic. But as more messages appear with that tag, then more analysis can be done and the extraction of the true keywords improves.

As a practical point, when a hashtag is new, with only a few messages, then there is little indication that it will be popular. If Theta decides not to show ads until some level of popularity is achieved, this gives more data to isolate the true keywords.

Another method can be used in addition to the above. If an author of a message with a new hashtag is known to Theta to have a popular following, either on Theta or in the real world, this improves the chance that a hashtag will be popular. Theta can use any previous posts by the author and any knowledge of the author outside Theta to guess at the topic of the current message and hashtag.

In non-real time, Theta finds its most popular authors. It finds topics they most often remark on. When a new message by such an author is posted, Theta can use the keywords from earlier posts as possible keywords for the current message.

Figure 9:
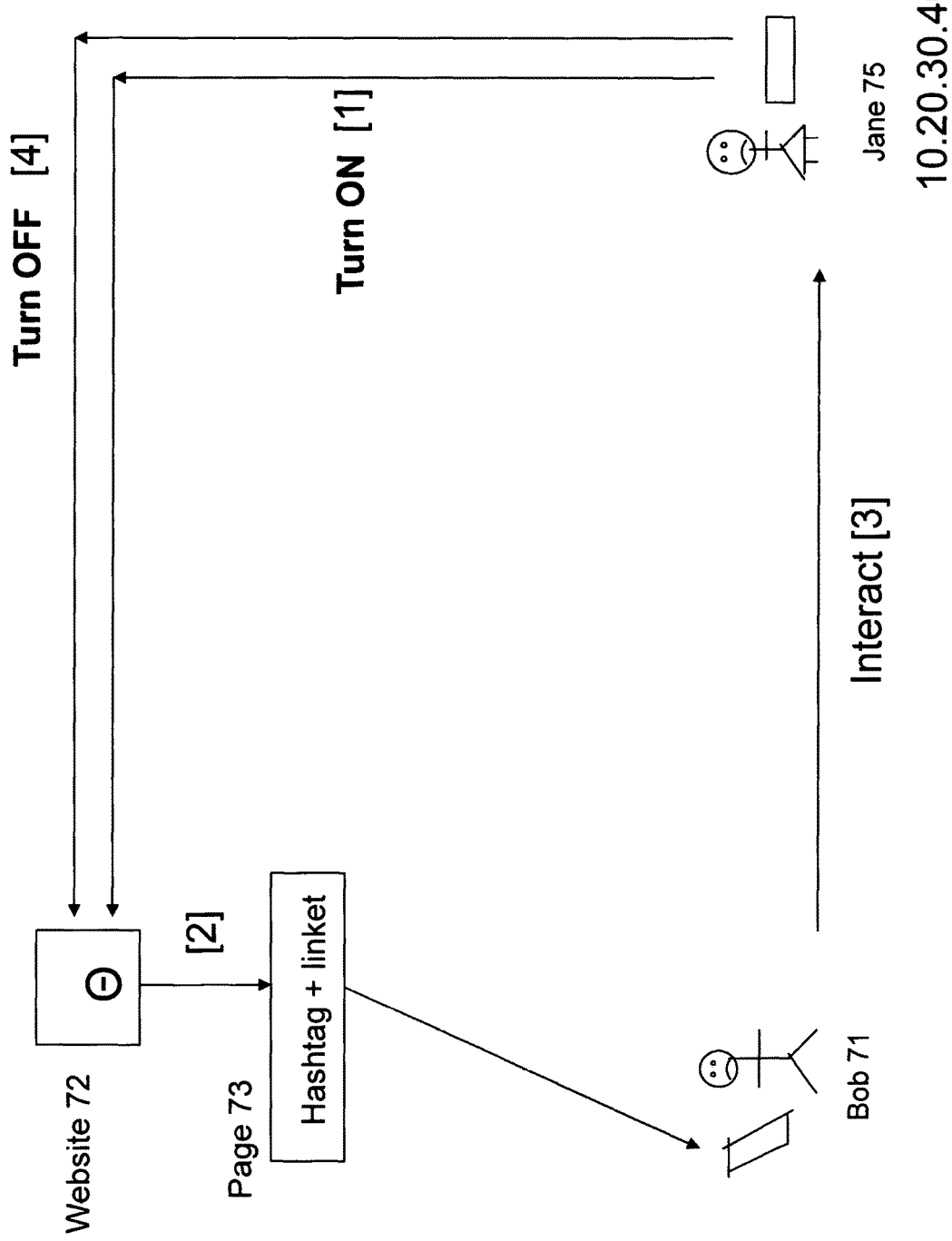
FIG. 9 shows Bob turning off Jane's linket by clicking on it.

6: Feedback Loop;

There is an ability to implement a feedback loop across the different devices. See FIG. 9. This extends FIG. 8. Step 1 is where Jane signs up her linket with Theta, as was discussed earlier for FIG. 8. We label this "turn on" here to indicate that she wants Theta to show her linket. Step 2 has Theta making a page with the hashtag and linket and other items like messages with the hashtag. This appears on page 73.

Bob 71 sees page 73 on his mobile device. He clicks the linket and he interacts with Jane 75 in step 3. We omitted several steps compared to FIG. 8, for clarity in FIG. 9.

Suppose Jane has a capacity limit for how many Bobs she can teach or interact with. Earlier, we discussed the concept of a capacity for a linket (or deep link). Beyond this limit, the teacher cannot have more students.

One way to do this is for Jane to tell Theta the maximum number of clicks on her linket in page 73. After this is reached, Theta will remove her linket. But this can be awkward as a strict rule. On occasion, even before her capacity has been reached, she might want to stop taking new sign ups. For whatever reason. Perhaps her existing students or audience are proving too intensive in attention demanding that she cannot handle more. Step 4 is 'turn off'. She sends a signal to Theta asking for her linket to be removed from page 73.

The trigger for this is Bob's clicking her linket. At some time after his action, her device does step 4. Hence if Bob refreshes his copy of page 73 after step 4, her linket will be gone. Or Theta might refresh his copy, which could be preferable as it is one less manual action needed by Bob. Likewise, other users who have their copies of page 73 can do a refresh or see it auto-freshed to remove Jane's linket.

This constitutes a feedback loop between Bob's device, Jane's device and the website Theta.

7: Ad Hoc: Community of Visitors;

Previously in this submission, when the user, Bob, clicks the deep link or linket, this caused a running of an app that hooked him up to another user (Jane) who acts as a teacher. Bob has the role of a student in that app. Jane is not typically reading the same page on her mobile device. But the methods of FIGS. 2 and 3 yield another scenario.

The deep link or linket can let Bob run the app. But now he interacts with another visitor, Lucy, to that page. More generally, in FIG. 2 or 3, if Bob clicks, then via the app he goes into a community of an arbitrary number of other visitors to the page.

The app permits an ad hoc community of visitors to a webpage. The interactions between them are not restricted to webpage-type interactions using HTML.

Call this app X. The deep link or linket can have an argument that specifies that web page. So X enables different groupings of users, around different pages. The users can have different interests, as suggested by the topics of the hashtag messages.

A group might have a senior person who acts as a mediator of the discussion or interaction.

In this sense, the use of a deep link or linket might be better suited for some contexts, rather than where a user is getting taught a subject.

One use case is where the topic is a given sport or sporting event or sporting team. X can offer the users a communal forum. Perhaps for playing fantasy sports.

Another use case is dating. When X starts, it can let Bob input his gender and whether he is looking for women or men. Then it shows appropriate content.

For the above cases, there are already several mobile apps. The use of this submission is not to write new apps to compete with those. But to let existing apps be modified in simple ways so that new users can install these and run them with minimum effort. And to let the apps propagate as easily as possible to potential new users like Bob.

Figure 10:
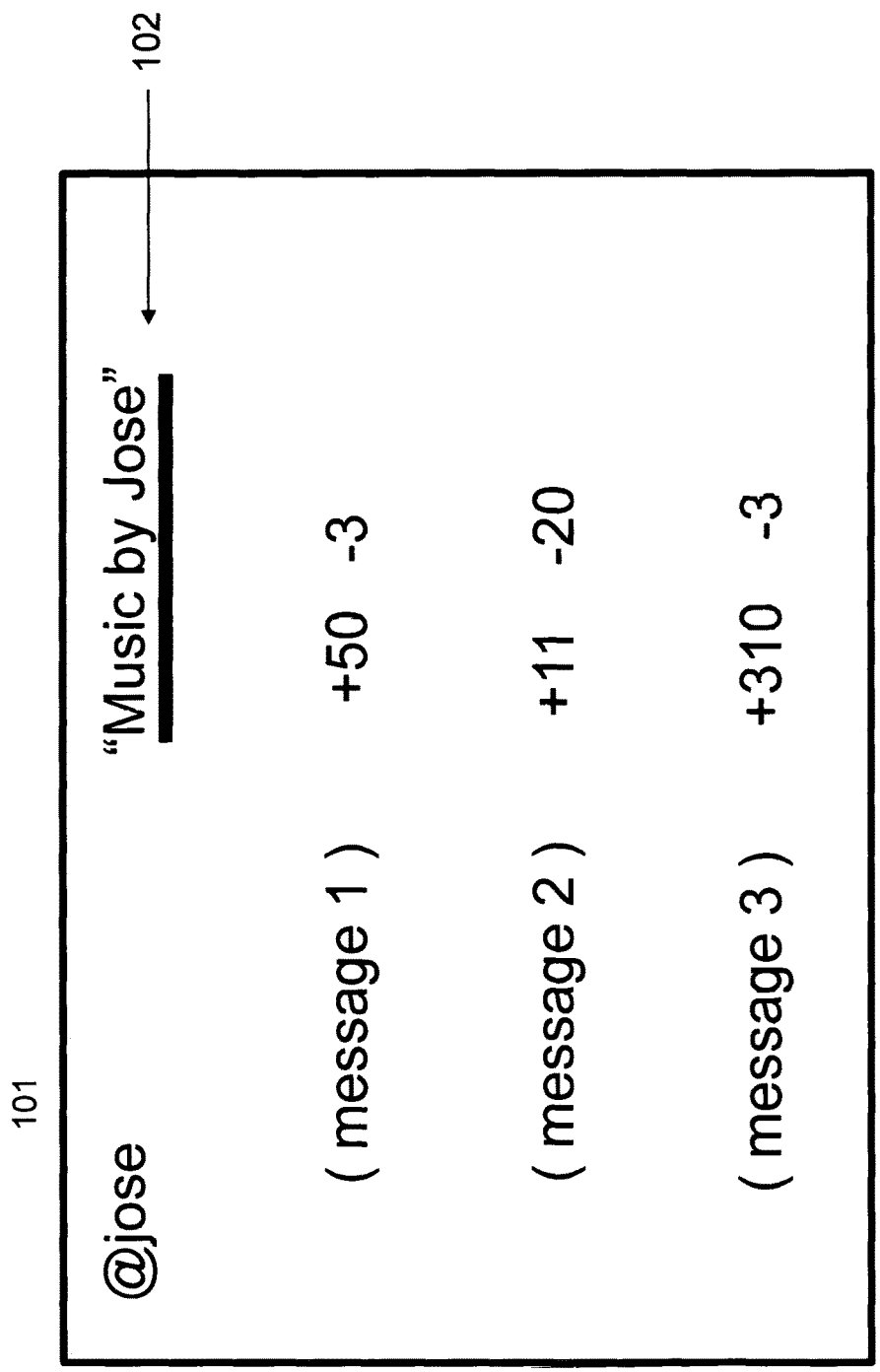
FIG. 10 shows a page of a user address and linket.

8: Hosting Page of Messages from an Author;

FIG. 3 showed a page with a hashtag and linket, along with messages that contained the hashtag. In general the messages are from different authors. FIG. 10 has another typical page on sites that host hashtags.

Item 101 is a page where the messages are all by the same author. These messages can have different hashtags. The author is denoted at the top of 101 as "@jose". Imagine that he is Jose. The author address might be clickable or not, depending on how Theta implements the page. Often, the notation for designating the author of a message with a hashtag is to use the '@' symbol in front of the author's username or handle. For example, Twitter uses this notation. But our remarks pertain also when other symbols are used to designate the author.

What is new is the linket, shown as a clickable link 102 to the right of the author's name. If linket 102 is clicked, the browser and/or the mobile operating system have earlier been suitable modified to install (if necessary) and run the underlying app of the deep link in the manner of Section 1.

The linket can be an ad, in some (most?) circumstances. But one important case is where the linket is owned by the author.

Currently, people who write messages with hashtags do so for various reasons. If the author is, say, a musician, he might be advertising his new album or an upcoming concert by him. This social media promotional aspect has emerged as important and is now common. The present section lets the author of the messages give new interactive possibilities for people interested in interacting or following him. By the author picking a suitable app pointed to by his linket, the interactions with his followers can be more engaging than via webpages and HTML.

By Theta letting Jose post a linket, it gives him more incentive to write more messages and have these be as compelling as possible. This also lets Theta charge Jose for showing his linket.

An alternative in FIG. 10 is for a third party advertiser to show its linket next to Jose's address. Here, Theta can have run a topic analysis on Jose's messages to find those topics he writes about. Then in an automated way similar to what was discussed earlier, an advertiser using a linket for one (or more) of Jose's topics can bid for ad linket placement in FIG. 10.

The topics found from the messages in FIG. 10 can be weighted by time and popularity. More recent messages might have higher weighting than older messages.

For popularity, Theta might have some indicator of how popular each message was. Perhaps readers can 'like' or 'not like' a message. This is depicted by the numbers and plus and minus signs by each message in FIG. 10. Message 3 is the most popular. Jose could be represented by a vector of topics in his messages. Where for a given topic, the weighting is influenced by (proportional to?) the popularity of the messages on that topic. This guides an advertiser about what Jose's fans are more likely to be interested in. In FIG. 10, if there are only the 3 messages, then the topic of message 3 can likely be what tells an advertiser to put a linket on that topic.

Or since an advertiser is likely to only have linkets on certain topics, the topic of message 3 can attract advertisers who already have linkets on that topic.

In FIG. 10, only 3 messages are shown. In general, there can be more, where other messages are shown by various means. Like scrolling down or clicking on a next page button.

Figure 10A:
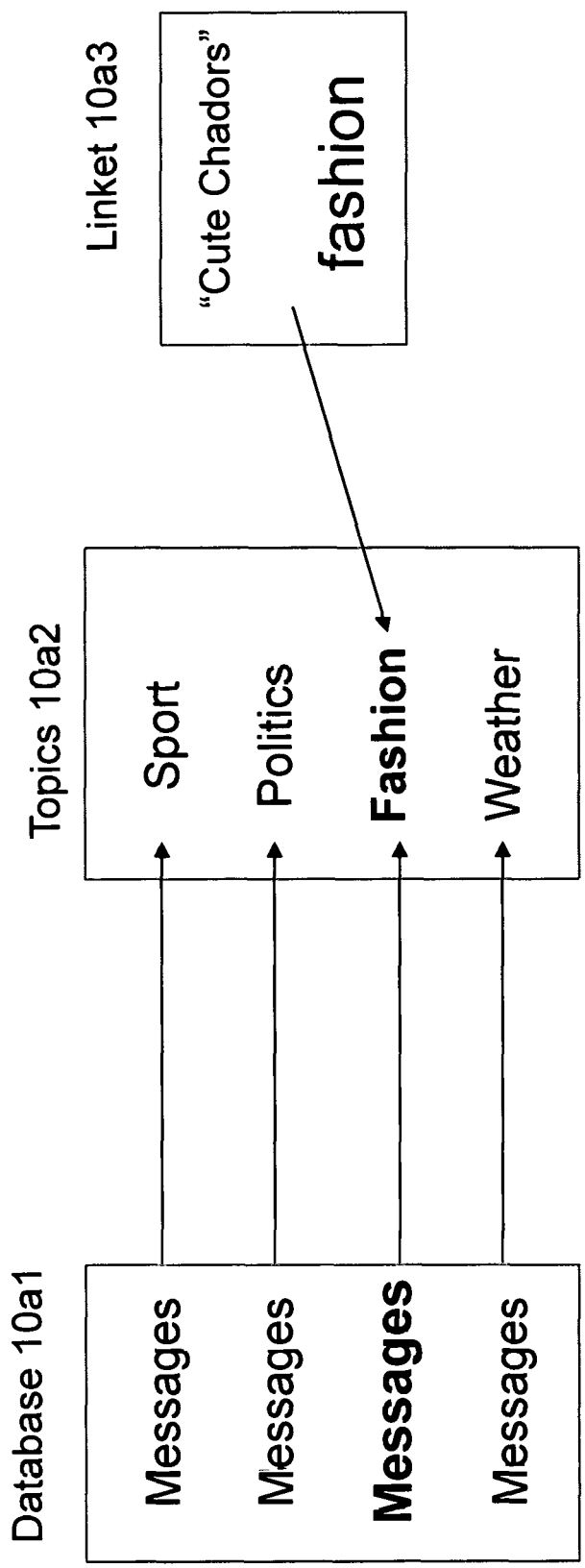
FIG. 10a shows an advertiser submitting a linket to a website of messages.

FIG. 10a shows a database 10a1 of messages with hashtags. This is in Theta. Theta runs an analysis engine which makes Topics 10a2. An example list of top level topics is shown. For simplicity, the messages are all assumed to be in only one topic, and the messages are grouped by topic. External to Theta, an advertiser makes a linket 10a3, "Cute Chadors" and (probably) manually assigns the topic "fashion" for the linket. This doublet of linket and topic is sent to Theta, which matches it with the topic fashion and then with the associated messages in 10a1. The latter messages are shown in bold in item 10a1.

There can be further steps. Possibly the advertiser furnishes subtopic classifications for its linket. This classification scheme might be defined by Theta and published so that advertisers show the structure of topics and subtopics.

When a set of appropriate messages have been found in 10a1, that correspond to a linket, further steps can be done to define a final step of messages by which or in which to show the linket.

Figure 11:
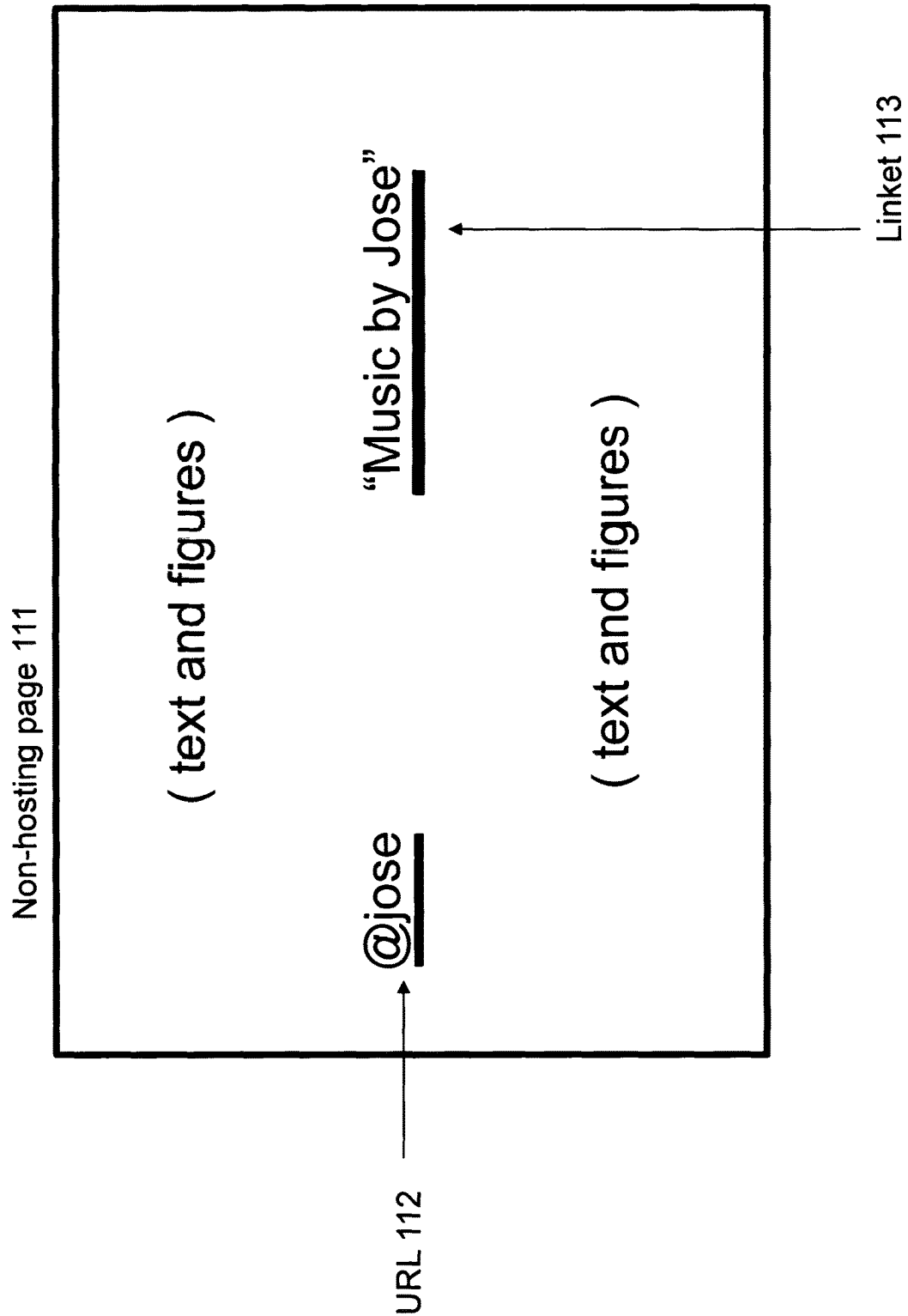
FIG. 11 shows a non-hosting page with a user address and linket.

9: Non-Hosting Page;

Consider a non-hosting page 111 as shown in FIG. 11. This is a page on a website that is not Theta. The page shows a standard URL link to a hosting page on Theta. The link is item 112, which points to the page of FIG. 10. The link is indicated by the bar under the text of 112, to suggest a clickable link. This 112 is common on third party websites that refer to an author's messages containing hashtags on Theta.

What is new is item 113, which is a linket, with the same label as the linket of FIG. 10. The linket lets the reader of page 111 on a mobile device interact with the underlying mobile app of the associated deep link. The point is to let the website of 111 offer the reader a broader choice of interactions than just standard HTML.

Figure 12:
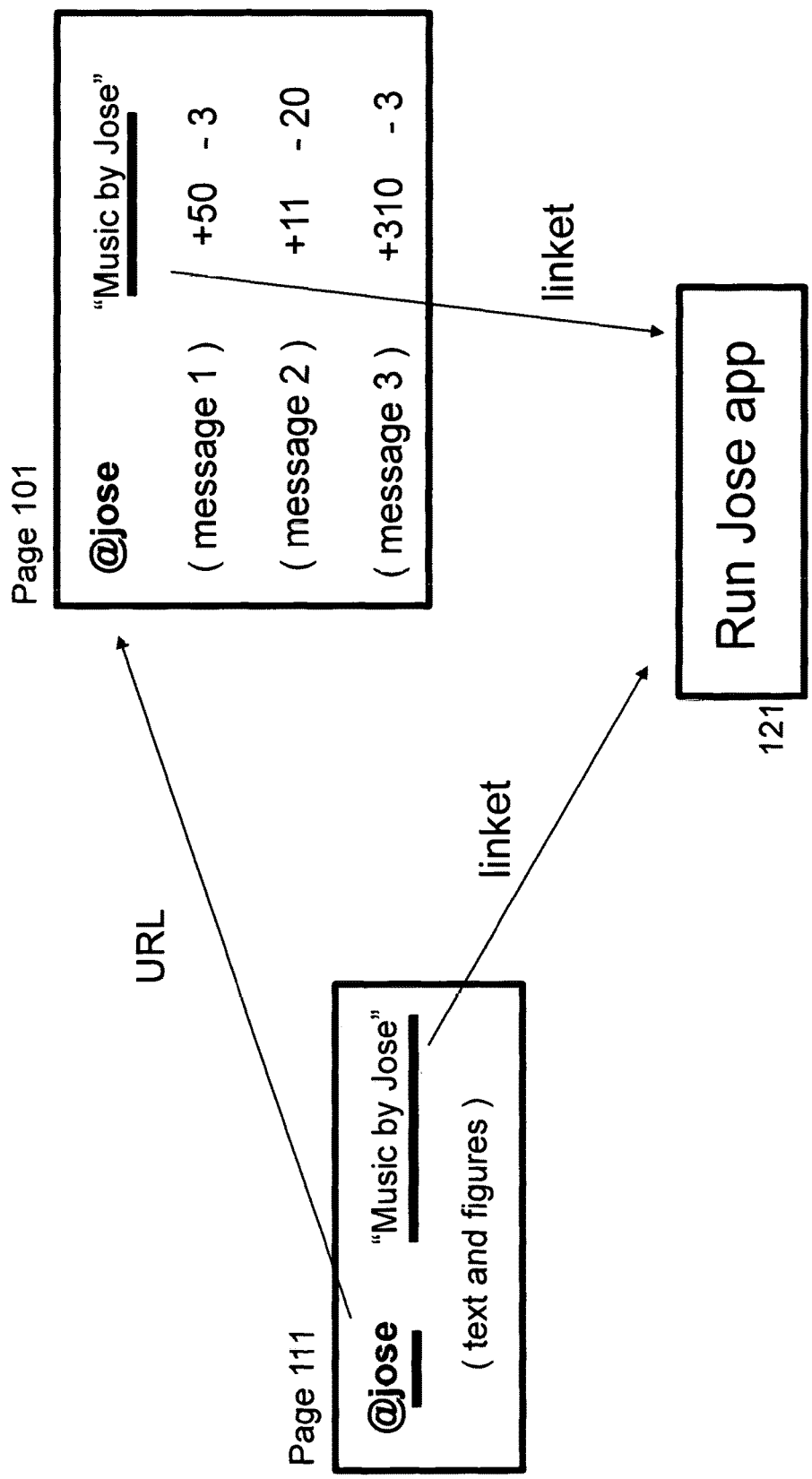
FIG. 12 relates FIGS. 10 and 11.

FIG. 12 relates FIGS. 10 and 11. It shows item 111 of FIG. 11. The arrow going from "@jose" in item 111 to item 101 is labelled "URL" to show that this is a standard URL. It means that if "@jose" is clicked in 113, page 101 is shown. While the arrow from the linket in 111 to item 121 is labelled "linket". This means that if the linket item in 111 is clicked, it causes the running of the Jose app.

Similarly, if the "Music by Jose" in 101 is clicked, the arrow labelled "linket" goes to item 121. This causes the running of the Jose app, invoked by the action in page 101.

Explicitly, item 121 is an action, unlike items 101 and 111, which are pages.

Note that pages 101 and 111 are on different websites, of independent companies, in general. For simplicity, the linkets in both pages are assumed to be the same. This is not a necessity. They can differ. The website showing page 111 can have different criteria to show a linket ad associated with the "@jose". Plus if the website for 111 shows a linket ad, there is no requirement that Theta's page 101 show any linket ad. And vice versa.

Also, pages 101 and 111 depicted the linkets as being in the same position, relative to "@jose". In general, the positioning of the linket relative to the name of the hashtag author can differ. These are placement decisions of webpages of different companies.

Another remark about page 111. Jose's username or address at Theta might be written when Jose is the author of an article on the page. The website gives his @jose address as another means for interested readers to see what else he might have written that has hashtags and which are cataloged on Theta. In the article on page 111 however, there is no requirement that Jose has used any hashtags.

Figure 13:
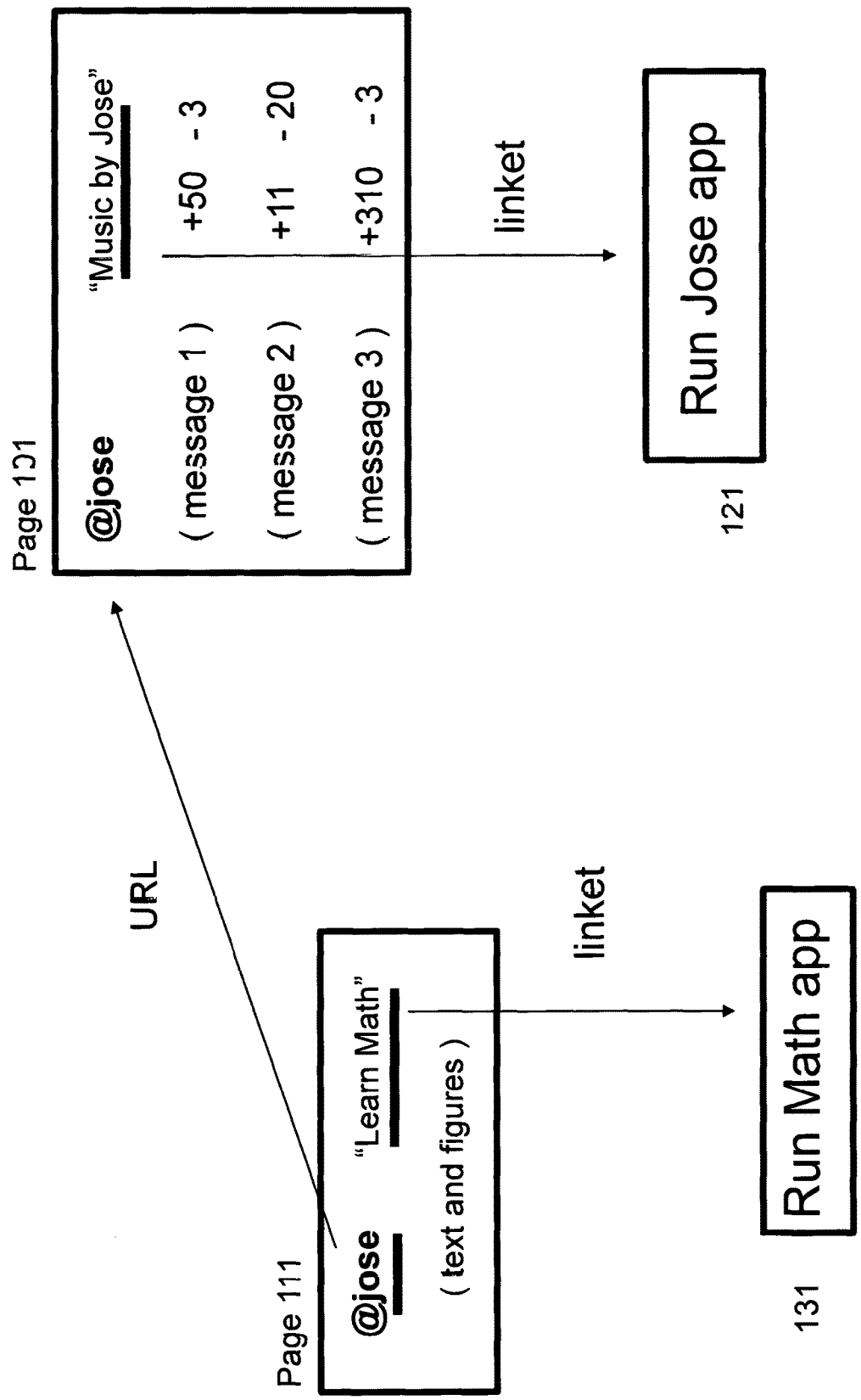
FIG. 13 shows 2 different linkets for the same author.

The previous section described that on page 101, the linket ad need not be by Jose. It could be by another other advertiser who, presumably, offers a linket on a topic the same as one that Jose has written about. Likewise for the third party site of page 111, the linket ad placed close to the URL label for Jose's username can be by another advertiser. This is shown in FIG. 13. Suppose page 111 has an article by Jose about learning math. The website for page 111 has put a linket "Learn Math" which if clicked goes to item 131, the running of a specific math app. In this case, it could be that the messages he wrote with hashtags, and shown in page 101, have nothing to do with math.

FIGS. 10-13 are a summary presented in the point of view of the user with the mobile device. For simplicity, the servers hosting pages 101 and 111 are not shown. Ditto for the app store from which the Jose app would be downloaded if it does not already exist on the user mobile device.

10: Linket Overlay;

Consider a website Phi that lets users surf the web inside its webpage. The page has an address bar, like the main address bar of the actual browser. If the user types an URL into the page address bar, the Phi server goes to the URL page, downloads and alters any URLS to first go to Phi, and then shows the page in the Phi page. Phi acts as an overlay.

Phi also parses the original page, looking for any hashtags. A hashtag might be the visible text of an URL or not. In either case, Phi makes the hashtag a link pointing to Phi. If the user clicks the hashtag, Phi can show a popup with one or more linkets. Or Phi can show an entire new page inside its page, where the new page has a list of linkets. In either case, the list could have additional explanatory background about the list or about each linket.

If the user picks a linket, then as usual in our submissions, an app is installed if necessary and run. Communicating with another instance of this app or with another instance of another app.

The above lets Phi retrofit onto existing webpages at other websites by acting as a linket overlayer. Phi's value is in picking appropriate linkets for hashtags written by others. Phi can parse the page in which a tag appears to find the topic of the page and then find an appropriate contextual linket on the same topic.

There are 2 other ways to do the above. One is by a browser modification. An existing browser might let third party mods be installed. A mod would access a database on the Internet with information on linkets for ads. The mod parses a webpage to be shown and makes hashtags clickable. The mod associates one or more linkets to a tag. The linkets are (hopefully) on topics similar to the topic of the page. Clicking a tag has the same effect as above with Phi.

Figure 14:
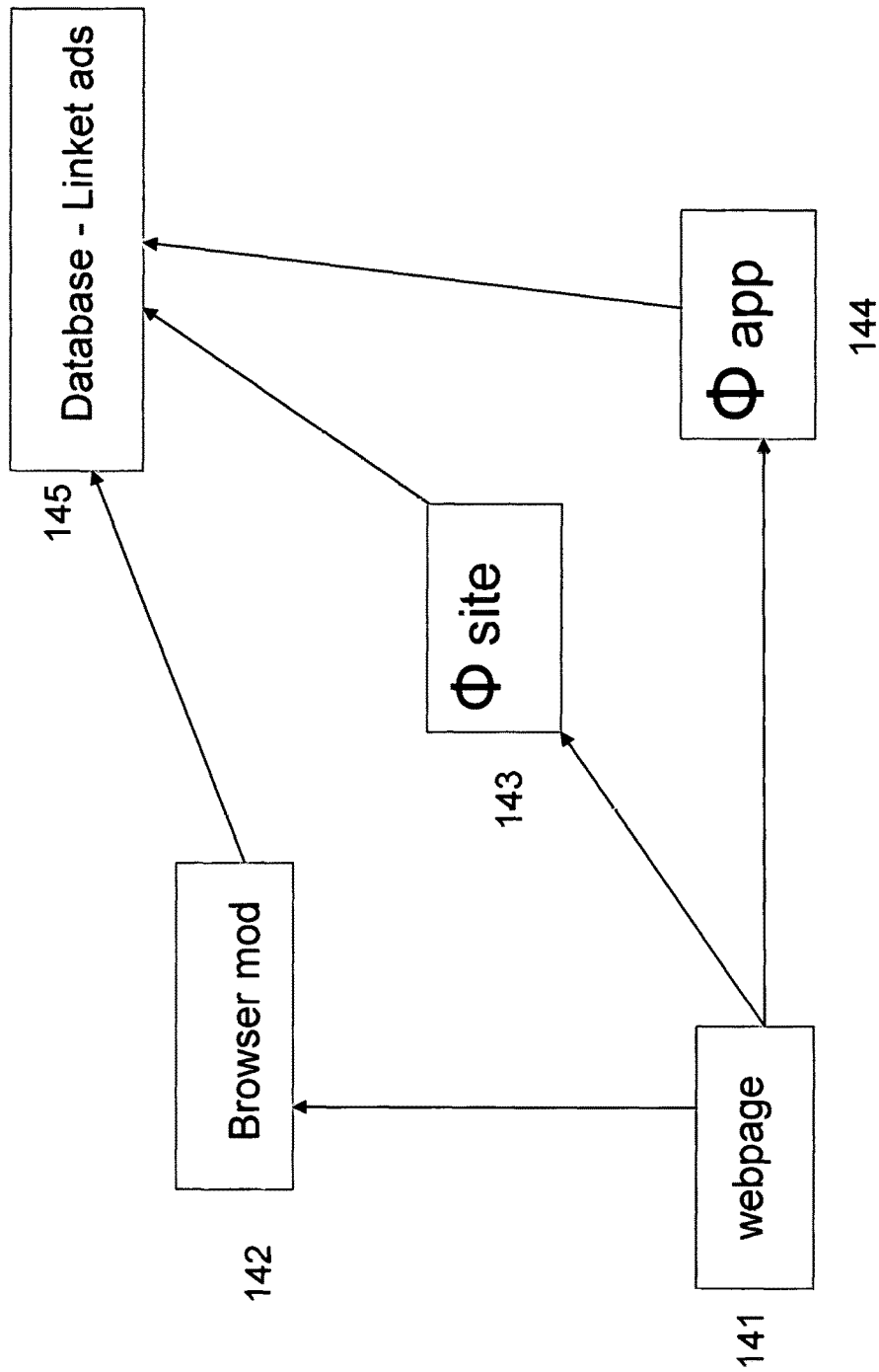
FIG. 14 shows 3 ways of associating linket ads with webpages.

Another way is for Phi to be a standalone app. It functions in part as a de facto browser. With the above functionality. FIG. 14 depicts this. Item 141 is a webpage. It can be accessed and altered by item 142, a browser mod, or item 143, the Phi website, or item 144, a Phi app. All 3 means use item 145, a database of linket ads.

These ways are not confined to looking for and making hashtags clickable. Other types of data in a page could be found and make clickable, to bring up linkets associated somehow with the page or with the item. The item could be an image. Or a sound file or video file.

11: Hashtag Collision at Linket Registry;

Hashtags can be defined at different websites, like TWITTER and FLICKR. A collision can happen. Two sites independently define the same hashtag with different meanings. Imagine a site that defines #cola as meaning for sodas. Another site defines #cola as Cost of Living Adjustment. Normally this would not be a problem.

Now suppose the linket Registry lets hashtags be defined there. A hashtag might map to a deep link or to a linket. A given hashtag could map to a given deep link, while a different hashtag maps to a given linket. Or the Registry could have a policy that, say, any hashtag can only map to a linket.

If a hashtag maps to a deep link, then since the latter can be expected to vary on the time scale of hours, this hashtag effectively becomes a linket.

The problem arises now because other sites that define hashtags might also want to define these at the Registry. Especially if they want to use their hashtags in conjunction with deep links or linkets in the manner of the earlier sections of this submission. There is incentive for the other sites to rapidly register a hashtag with the Registry. So as to have a hashtag with their specific intent or imputed meaning.

As with a linket, the Registry would charge a fee for the registration.

Then, the site that owns a hashtag in the Registry can map it to a deep link or linket. Another fee would be imposed by the Registry, just as it would for a linket owner to map the linket to a deep link. The fees for a hashtag need not be the same as for a linket. This gives the Registry more revenue sources Suppose a site owns a hashtag X at the Registry. In its webpages, it can use X just as it would a linket, in making a clickable link to the Registry. So in FIG. 3, where a linket was shown next to a tag, it might just merge the linket into the tag. A user clicking on the tag might go directly to using the linket.

Note that in general if a site owns a hashtag at the Registry and it points to a linket, that linket has a different owner. But the Registry could have a policy that if the owner of a hashtag also owns the linket pointed to by the tag, then this is indicated in some manner when the Registry outputs the hashtag or linket. Downstream, an app or browser that shows the hashtag might use this to designate that the mapping from hashtag to linket or vice versa is authoritative.

12: Linket and App for Hashtag Collision;

We describe an example of an app and linkets that use this app, for handling hashtags across different sites. Suppose there are 3 sites that define hashtags—Twitter, Instagram and a third site, A. Here, A represents any other site that defines hashtags.

The scenario here is not like the previous section. Here, we can imagine an event that causes hashtags to be made for it on all 3 sites. In general, the tags will have different names. Messages posted to those sites with the tags will describe different aspects of the event. This might be a fire in the Bronx of New York, for example.

Call the app UnitedTags. Let Tom be a power user who uses the app in the following manner, to define a graph of tags across all 3 sites. We use the notation t#hashtag to mean a hashtag defined on Twitter, and i#hashtag for a hashtag defined on Instagram and a#hashtag for a hashtag defined on A. The point about UnitedTags is that it gets around a current problem with different sites defining tags. Suppose some tags are about the same real world event.

Each site has little incentive in providing links to associated tags on competitors' sites. The user has to somehow manually go to each site and figure out what these tags are, to get a broader picture of the event.

Figure 15:
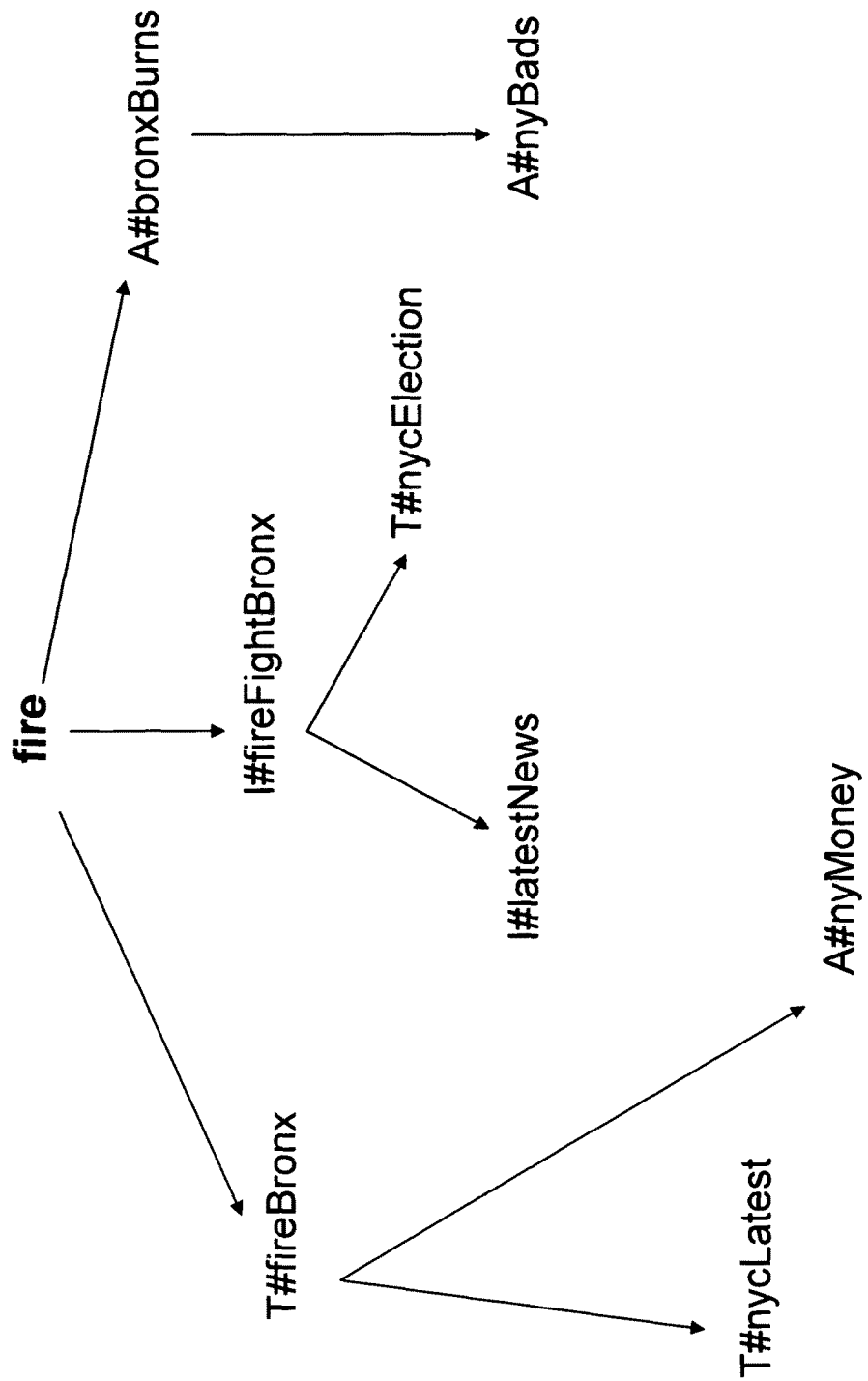
FIG. 15 shows a graph of tags across different websites.

See FIG. 15. Tom draws the graph. Starting from the root node 'Fire'. In this implementation of UnitedTags, from a tag at a given site, it lets Tom draw edges to tags at that site and other sites. Other versions of UnitedTags might only let the edges go to tags at the same site. With the root node being the only exception.

FIG. 15 can be supposed to be what another user, Ann, sees when she goes to Tom's home page on UnitedTags. (Imagine that he does not have any other graph drawn there.) If Ann clicks on a given node, the app goes to that site and shows the page in a window of UnitedTags. This supposes that UnitedTags can parse or screen scrape or otherwise extract the contents of the relevant external page (via an API) and show the contents.

Or, when Ann clicks on a node with a TWITTER tag, a TWITTER app is loaded with that tag and shown on her device. Likewise with tags from other sites. This reduces the effort on UnitedTags.

Tom's use of UnitedTags can be exposed to others via a linket of his, "Tom on UnitedTags". This maps to a deep link unitedTags://30.31.32.33, where the latter address is the current address of his (mobile) device.

Another user, Doris, who clicks his linket then sees what Ann sees in FIG. 15. (We assume that Ann did not use Tom's linket.) A visitor to Tom's graph may be able to alter it, subject to certain limitations. Tom may be able to protect a version. While letting others alter it gives a crowd sourced way for building an extensive graph.

Visitors could add comments at each node. Perhaps a simple yes or no to agree or disagree about the inclusion of that node in the graph. But the comments could be more elaborate.

The initial nodes in the graph do not have to be about the same event. Tom might find what he considers to be related tags across the sites on, say, politics. By associating these together in a 'politics' graph, he offers some value to visitors of a convenient portal onto the hashtag-defined messages about the topic.

An alternative to the display of FIG. 15 can be to use color coding. So the A# tags might be in yellow, the T# tags in green and the l# tags in blue. Etc.

13: Alternative Deep Link;

In submission 18, section 2, we described an alternative format for a deep link, that our linket points to. This is where a deep link has the format appId://xyz, where xyz is a code used by the app server. Jane, the first user of the app, has her app instance contact the app server. The latter records Jane's device address, say 10.20.30.40, in an internal table, where this is mapped to a random string, depicted as xyz. The string is sent to Jane's app instance, which then uses it to make the above deep link. Instead of her app instance just reading her device Internet address and making the deep link without recourse to the app server.

For the present submission, in the various locations that a linket was used, the linket can point to the above deep link. With little or no change to the narrative of the earlier sections. In those places where the linket was located, a deep link might directly be used. For this, the deep link of this section is also possible. An implementer of this submission can choose either format.

14: Picking a Hashtag for a Linket;

Previously, we discussed placing a linket (or deep link) near a given hashtag, and ways to pick that linket, based on the topics associated with the tag. Now suppose we have a page (a webpage or a page/screen of an app) that shows a given linket. And the page as yet does not have a hashtag. We want to put a hashtag on the page, perhaps in some proximity to the linket. The topic of the linket can be found, from machine or manual analysis of the underlying app, as well as from data about the linket given by its owner. Thus, we can put a hashtag (or several) near the linket, about the same topic.

For further relevance, the hashtag can be chosen from those about the topic, as the newest or the most popular.

For example, suppose a linket is about baseball. The hashtag to be shown near it is about baseball.

A simple graphical association between linket and hashtags could be where, say, right clicking on a linket pops up a menu of hashtags. The choice of tags would be from the same or closely related topic as the linket A useful feature is where for many linkets, there is a rule to find a hashtag corresponding to a linket. The hashtag is defined at a website like TWITTER that defines many other hashtags. This does not mean that every linket would have such a hashtag.

The value of the rule is so that when a user sees a linket on his mobile device, she can search a hashtag website (like TWITTER) to see what the linket owner and others have posted about the linket. She can do this before deciding whether to click the linket or not. If the reviews of the hashtag, which correspond to reviews of the underlying linket, are positive, this can help her decide to click the linket and install its app.

What could this rule for the mapping of linket to hashtag be? One answer is to deliberately leave a specific choice outside this submission. An industry body or a de facto agreement in the marketplace might suffice to make that choice.

Here are some possible requirements for the rule. Suppose the linket has whitespace. There is a subrule to convert the whitespace to characters or symbols used in a standard hashtag, as defined by that hashtag website.

What about collision? Someone has earlier defined a hashtag at the website, for some purpose. This hashtag is the same as a hashtag for a linket. So the linket hashtag might be written with, say, a unique symbol at its start, after the # symbol. This unique symbol (or symbols) is normally prohibited in all other non-linket hashtags. It is used only to prevent collisions.

Whatever the choice of rule, suppose the rule is defined. When a user sees a linket on her device, she does some GUI step to invoke the rule and bring up a screen or page at the hashtag site for the appropriate hashtag. The rule has been coded into her mobile browser or app or operating system.

Or when a linket is defined, an URL of the corresponding hashtag page at the hashtag website is associated with the linket. This might be in a field of the data structure holding the linket.

The invention claimed is:

1. A method consisting of a first mobile device interacting with a registry and a second mobile device;
   where the first mobile device displays a page in a browser or app;
   where the page came from a server;
   where the page includes a hashtag, a first linket and a messages containing the hashtag;
   where the first linket is clickable;
   where the first linket is clicked;
   where the first mobile device sends the first linket to the Registry;
   where the first mobile device receives a deep link;
   where the deep link has an id of an app;
   where the deep link has a network address of a remote instance running on the second mobile device;
   where the network address is not an URL (Universal Resource Locator);
   where the network address does not contain an URL;
   where a local instance of the app is run on the first mobile device;
   where the local instance connects to the remote instance;
   where the local instance interacts with the remote instance.

* * * * *